Sept. 8, 1953
A. B. GUISE ET AL
APPARATUS FOR PRESSURIZING CONTAINERS
FOR FIRE-EXTINGUISHING DRY CHEMICALS
Filed Jan. 31, 1951
2,651,375
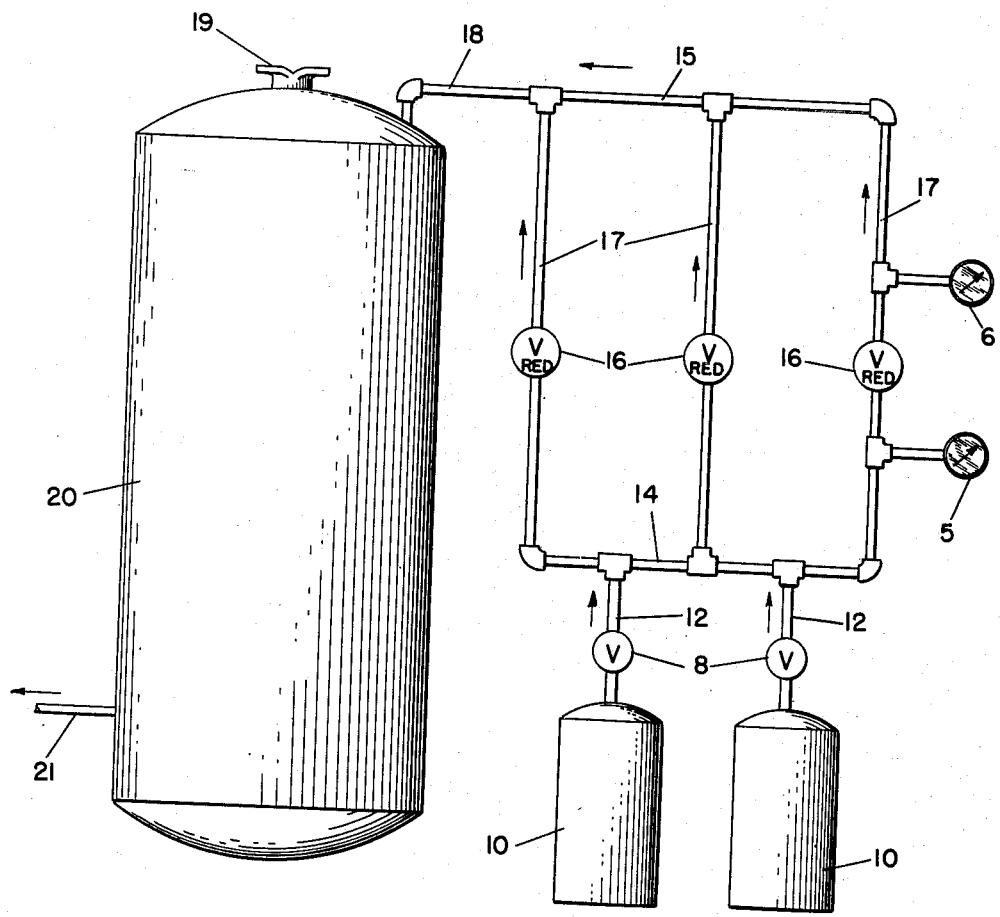
INVENTORS.
ARTHUR B. GUISE &
BY    ALDEN ALLEN
Joseph Rossman
ATTORNEY Patented Sept. 8, 1953

2,651,375

UNITED STATES PATENT OFFICE 2,651,375

APPARATUS FOR PRESSURIZING CONTAINERS FOR FIRE-EXTINGUISHING DRY CHEMICALS

Arthur B. Guise, Marinette, Wis., and Alden Allen, Menominee, Mich., assignors to Ansul Chemical Company, Marinette, Wis., a corporation of Wisconsin Application January 31, 1951, Serial No. 208,823

2 Claims. (Cl. 169—11)

This invention relates to an apparatus for obtaining rapid pressurization of large tanks used in dry chemical fire-extinguishing systems.

Dry chemical fire-extinguishing systems employ powdered dry chemical compositions which generally contain sodium bicarbonate as the essential ingredient. Such a composition, for example, is disclosed in Patent 1,793,420 February 17, 1931. In using such compositions it is necessary to convey same to the site of the fire to be extinguished by suitable pipe lines or hose in the form of a stream of the dry chemical fluidized by gas under pressure. The fluidization is accomplished by storing the dry chemical in a closed chamber or tank and feeding therein an inert gas such as nitrogen which is stored in metal cylinders at about 2000 lbs. per square inch pressure. When the gas is released from the storage cylinders it is necessary to reduce its pressure to about 200 to 250 lbs. per square inch prior to feeding same to the dry chemical chamber. This is accomplished by means of a pressure regulator or reducing valve connected to the gas feed line.

When using large dry chemical storage chambers, it is desirable to fluidize and pressurize the chambers as rapidly as possible in order to quickly supply a stream of the dry chemical when needed for fire-extinguishing purposes. It has been found impractical to use a single large capacity pressure regulator such as 400 cubic feet per minute for this purpose because they are usually not efficient. Large pressure regulators tend to leak and are difficult to maintain in working condition. Furthermore, large pressure regulators are expensive and at best not too reliable in controlling and maintaining desired predetermined pressures.

The aforementioned difficulties are overcome by the present invention in accordance with which a source of high pressure dry chemical fluidizing and pressurizing gas from one or more containers is reduced to a desired lower pressure by passing the high pressure gas through a plurality of relatively small size gas pressure regulating valves connected in parallel to a single low pressure conduit which in turn is connected to the dry chemical chamber whereby the desired pressurization in the chamber is accomplished rapidly.

Further advantages and details of the invention will be apparent from the following specification and accompanying diagrammatic drawing wherein numeral 10 indicates one or more cylinders of gas under pressure, such as nitrogen under a pressure of about 2000 lbs. per square inch. The cylinders 10 are connected by suitable conduits 12 to a high gas pressure manifold 14. Valves 8 control the flow of gas under pressure from either or both of the cylinders 10 as may be desired. The manifold 14 is in turn connected to a low gas pressure manifold 15 by a plurality of spaced conduits 17 connected in parallel. One of the conduits is provided with a high pressure gauge 5 and a low pressure gauge 6 to indicate respectively the prevailing pressure in the supply cylinders 10 and the pressure in tank 20. Each connecting conduit 17 is provided with a relatively low gas capacity pressure reducing valve 16, for example, 100 cubic feet per minute, each of which functions to reduce the high pressure of the gas flowing through conduits 17 to a relatively lower predetermined pressure. The manifold 15 is suitably connected by a conduit 18 to the dry chemical chamber or tank 20 in which dry chemical is stored. The tank 20 is provided with a removable closure 19 for supplying fresh dry chemical to the tank.

In operating the system, all the pressure regulators 16 are adjusted to reduce the gas pressure supplied from manifold 14 to substantially the same value. The number of pressure reducing valves used depends on the size and individual capacity of the valves used and the desired rate of flow of the gas. The pressure reducing valves may be of any suitable construction such as a conventional spring operated pressure reducing valve described in Perry "Chemical Engineers' Handbook," p. 1660, 1st ed., 1934. The pressure regulator valves are adjustable and can be set to reduce the high pressure gas passing therethrough to a predetermined pressure. When it is desired to supply a stream of fluidized dry chemical using the system herein described, one or more cylinders 10 containing high pressure gas, for example nitrogen at 2000 lbs. per square inch, are connected to manifold 14 and the gas under pressure is permitted to flow therein. The high pressure gas will then flow through the pressure reducing valves 16 in conduits 17 which are connected in parallel to the low pressure manifold 15 which will reduce the gas pressure to a predetermined value, for example 200 to 250 lbs. per square inch. The gas at reduced pressure will then be fed from manifold 15 through a conduit 18 to the dry chemical tank 20 for fluidizing the dry chemical therein and pressurizing the tank whereby a fluidized stream of dry chemical will be supplied from the tank 10 through conduit 21.

It will be apparent from the foregoing description that a simple but very effective system is provided by this invention for reducing the pressure of a gas used for fluidizing powdered dry chemical for fire-extinguishing purposes. In accordance with this invention it is possible to supply a large tank or container with pressurizing gas at a predetermined pressure in a relatively short period of time which hitherto could be accomplished only by use of very expensive and large capacity pressure regulators.

Changes and modifications may be made of the specific details of the invention herein described which are intended to be included within the scope of the present invention.

We claim:

1. A dry chemical fire-extinguishing apparatus for supplying a stream of fluidized dry chemical which comprises a container for storing powdered dry chemical therein, a manifold connected to said container for supplying gas under a predetermined pressure to said container, at least three spaced conduits connected to said manifold in parallel, each of said conduits being connected to a second manifold, a pressure reducing valve in each of said spaced conduits positioned intermediate said manifolds and a source of high pressure gas connected to said second manifold intermediate each pair of said spaced conduits.

2. A dry chemical fire-extinguishing apparatus for supplying a stream of fluidized dry chemical which comprises a container for storing powdered dry chemical therein, a manifold connected to said container for supplying gas under a predetermined pressure to said container, at least three spaced conduits connected to said manifold in parallel, each of said conduits being connected to a second manifold, a pressure reducing valve in each of said spaced conduits positioned intermediate said manifolds and multiple sources of high pressure gas separately connected to said second manifold.

ARTHUR B. GUISE.
ALDEN ALLEN.

References Cited in the file of this patent

UNITED STATES PATENTS

| Number | Name | Date |
|---|---|---|
| 866,109 | Brent | Sept. 17, 1907 |
| 2,177,581 | Purviance | Oct. 24, 1939 |
| 2,473,349 | Snowden | June 14, 1949 |